United States Patent [19]

Carr, Jr. et al.

[11] 3,825,910

[45] July 23, 1974

[54] PROPAGATION OF MAGNETIC DOMAINS BY SELF-INDUCED DRIVE FIELDS

[75] Inventors: Walter J. Carr, Jr.; Robert C. Miller, both of Pittsburgh, Pa.

[73] Assignee: Westinghouse Electric Corporation, Pittsburgh, Pa.

[22] Filed: June 11, 1973

[21] Appl. No.: 368,914

Related U.S. Application Data

[63] Continuation of Ser. No. 250,706, May 5, 1972.

[52] U.S. Cl........340/174 TF, 340/174 EB, 340/174 HA, 340/174 MS, 340/174 VA

[51] Int. Cl........................ G11c 11/14, G01r 11/06

[58] Field of Search..............340/174 TF, 174 EB, 340/174 HA, 174 MS; 324/34 R, 34 MC, 142

[56] References Cited

UNITED STATES PATENTS

| | | | |
|---|---|---|---|
| 3,521,253 | 7/1970 | Arndt | 340/174 HA |
| 3,603,939 | 9/1971 | Bobeck et al. | 340/174 TF |
| 3,701,126 | 10/1972 | Reichard | 340/174 HA |

*Primary Examiner*—James W. Moffitt

*Attorney, Agent, or Firm*—R. W. Smith

[57] ABSTRACT

A magnetic domain propagation device has a self-induced drive field for moving a magnetic domain in a thin magnetic layer of ferro-magnetic material. A domain drive layer formed of a current conducting material overlays the magnetic layer in a magnetically coupled relationship. An electric field is applied to the drive layer to produce a uniformly distributed current therein adjacent to the surface of the magnetic layer. A magnetic domain in the magnetic layer alters the uniform current density of the drive layer to produce a perturbed current region adjacent the magnetic domain. A resultant magnetic field is produced by the perturbed current which interacts with the magnetization of the magnetic domain so as to provide an induced drive magnetic field. The velocity and direction of the magnetic domain is controllable by variation of the applied electric field or by varying the current perturbing effects in the drive layer.

21 Claims, 14 Drawing Figures

PROPAGATION OF MAGNETIC DOMAINS BY SELF-INDUCED DRIVE FIELDS

This is a continuation of application Ser. No. 250,706 filed May 5, 1972.

BACKGROUND OF THE INVENTION

This invention relates to a magnetic domain propagation device having a self-induced drive magnetic field, and more particularly, to such devices in which a domain drive magnetic field is formed by the resultant magnetic field produced when a region of perturbed current is formed in a uniform current carrying drive layer due to the positioning of the magnetic domain adjacent the drive layer.

It is well known that certain materials, such as garnet or rare earth orthoferrites, are capable of being formed in thin magnetic material layers in which discreet magnetic domains, also referred to as single wall domains or magnetic "bubbles", are produced when subjected to a predetermined bias magnetic field. It is also well known that magnetic domains may be made to move within a magnetic layer to perform various functions such as data storage, logic functions, shift registers and the like. Presently, the usefulness of magnetic domain devices is determined by the available techniques to control the movement of the magnetic domains within the magnetic layer.

Among the prior methods used to control the propagation of magnetic domains one general technique includes the application of an external drive magnetic field so as to react with the magnetization of a magnetic domain in a magnetic layer so as to effect a propagation force in a desired direction. In one particular prior method, a pattern of conductor loops is laid on the magnetic layer and current is sequentially applied to these conductors to produce localized drive fields to thereby propagate the magnetic domain below the loops. The magnetic field generated by the current in the loop conductors move the magnetic domain from one loop location to the adjacent loop. In another technique, an alternating externally applied drive magnetic field is applied to the magnetic layer so as to expand and contract the magnetic domains beneath a path defined by arrow-shaped pieces made of Permalloy to form a so-called "angelfish" bubble-mover. In a still further technique, a pattern of thin Permalloy T-shaped and I-shaped bars are disposed on the magnetic layer and a rotating magnetic field is applied along this pattern. The shape of the pattern and the reversal of the applied rotating drive field are effective to move the magnetic domain, which in this technique maintains substantially the same size, from one end of the pattern to the other.

In each of the aforementioned methods of controlling the propagation of the magnetic domain, the drive magnetic field is applied from an external magnetic field source and the desired positioning or shaping of the drive magnetic field is provided by patterns of magnetic material to define a path along the magnetic layer. In certain instances these techniques limit the use of magnetic domain propagation devices, for example, when the patterns are used for controlling the magnetic domain paths these are normally fixed and are not easily changed.

SUMMARY OF THE INVENTION

In accordance with the present invention, a magnetic domain propagation device includes a magnetic layer made of a domain propagating material and a domain drive layer overlaying the magnetic layer and formed of a uniform current conducting material. Typically, the two layers are substantially parallel adjacent each other so as to be in an electromagnetically coupled relationship. Opposite ends of the drive layer are connected to a voltage source so as to establish an electric field therein in response to the potential of the source. The electric field causes a uniform current density to flow in the drive layer which effectively blankets or covers the surface of the magnetic layer. A bias magnetic field is applied to the magnetic layer so as to stabilize a single wall magnetic domain which, as understood by those skilled in the art, has a reverse magnetization from that of the magnetic layer. The drive layer uniform current density is altered immediately adjacent the magnetic domain to form perturbed current region in the drive layer. The perturbed current region produces a magnetic field gradient relative to the magnetization of the magentic domain so as to react therewith so as to form a self-induced drive magnetic field acting upon the magnetic domain. This drive magnetic field propagates the magnetic domain in a direction determined by the direction of the uniform current density in the drive layer.

The magnetic domain propagation device of this invention is capable of various modifications so as to control the movement of the magnetic domain in a magnetic layer. It is a general feature of this invention to provide a device for propagation of a magnetic domain in which the device includes a drive layer covering a thin magnetic layer and wherein an induced drive magnetic field is produced in response to the magnetization of the magnetic domain due to a region of perturbed current formed in a normally uniform drive layer current density.

It is another general feature of this invention to provide a perturbed current region in a uniform current density of a drive layer overlaying a magnetic layer of magnetic domain material to develop a resultant magnetic field effectively induced by positioning a magnetic domain adjacent to the drive layer so as to move the same magnetic domain without the use of an externally applied driving magnetic field and to avoid the use of any fixed patterns for establishing a magnetic domain path. Another feature is to provide a damping plate layer to a magnetic domain propagation device to retard the domain propagating velocity. Still another feature of this invention is to include a drive layer made of a material such as a magnetoresistive or Hall-effect material in which the magnetization of a magnetic domain directly varies the current conducting characteristic of the drive layer to produce a perturbed current region and effect a desired induced drive magnetic field. Another feature of this invention is to provide a uniform current conducting drive layer and an intermediate layer made of photoconductor or magnetostrictive materials and the like responsive to the magnetization of a magnetic domain in a magnetic layer so that a uniform current of a drive layer is varied in response to the changes in the intermediate layer to in turn develop a perturbed current region in the drive layer. A still further feature of this invention is to provide control of the veolocity rate of magnetic domain propagation by variation of an electric field applied to a drive layer and to further control the direction of the magnetic domain by varying the direction of the applied electric field.

It is a further important feature of this invention to employ the magnetic domain propagation device of this invention so as to perform various circuit functions. In one device made in accordance with this invention two drive layers are disposed in overlapping relationship on opposite faces of the magnetic layer so that two input signals control the electric fields of the drive layers so that a magnetic domain is propagated at a velocity proportional to the added or subtracted results of the electric fields depending upon the common or reverse directions of the electric fields, or, alternatively, the drive layer fields are produced perpendicular to each other so that variation of the electric field levels changes the direction of the domain propagation. A still further feature of this invention is to provide analog measurements of the average values to input signals which control a drive layer electric field by detecting the time for magnetic domains to travel between predetermined locations in a magnetic layer. A still further feature of this invention is to control the drive layer electric field and the resulting uniform drive layer current by a selectively controlled switch so as to provide a gating control feature in the propagation of a magnetic domain.

A still further feature of this invention is to provide measurement of the integral with respect to time of the product of two input signals applied to a magnetic domain propagation device for integration type measurements such as provided by a watthour meter. In accordance with this latter feature, a circular domain channel is provided in a magnetic layer and an alternating current electric field is applied radially to a drive layer overlaying the magnetic layer which field is controlled by either of the voltage or current components of an alternating current electrical power to be measured. The other of the power component establishes a control magnetic field acting upon the uniform drive layer current such that a magnetic domain is propagated in the channel at a velocity responsive to the product of the voltage and current components. A detector senses each revolution of the magnetic domain and is connected to a counter for registering the distance traveled by the magnetic domain which in turn is a measure of watthours.

These and other advantages and features will become apparent from the following description of the drawings.

DESCRIPTION OF THE PREFERRED EMBODIMENTS

Figure 1:
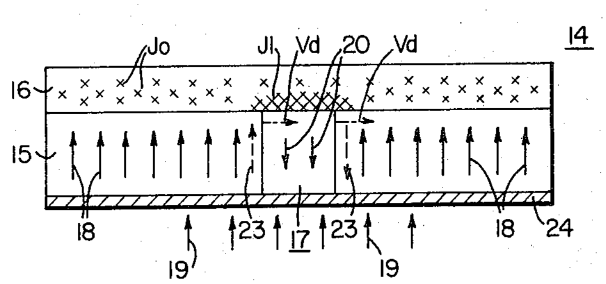
FIG. 1 is a cross-sectional view taken along the axis I—I of FIG. 2.
Figure 2:
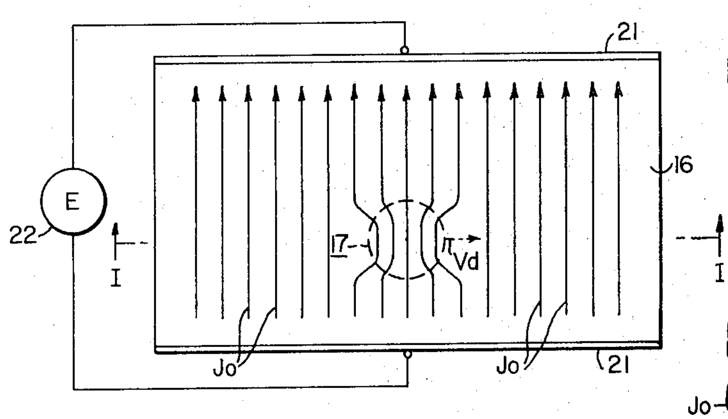
FIG. 2 is a top plan view of one preferred embodiment of a magnetic domain propagation device including a drive layer and a magnetic layer made in accordance with this invention.
Figure 3:
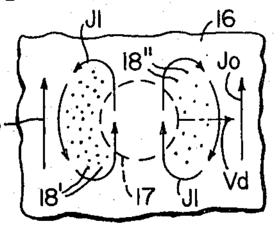
FIG. 3 is a fragmentary view of FIG. 2 illustrating the direction of a perturbed current region formed in the drive layer.

Referring now to the drawings, and more particularly to FIGS. 1, 2 and 3, there is shown a magnetic domain propagation device generally designated by the numeral 14. A magnetic layer 15 formed by a thin ferromagnetic material of the type utilized for propagating magnetic domains may be of any well known type. These materials are generally formed from a wafer of ferromagnetic material having magneto-crystalline anisotropy characteristics such as found in garnet and orthoferrite materials. Rare earth orthoferrites having the general formula $AFeO_3$ have been found suitable where A is yttrium or one of the rare earths such as terbium or ytterbium. A drive layer 16 forms an overlayer positioned in parallel relationship adjacent a planar face, the upper face being shown FIG. 1, of the magnetic layer 15. For purposes of this description, it is understood that the layers 15 and 16 have an infinite length and width and do not exhibit any edge effects.

The drive layer 16 includes a material having a substantially uniform current conducting characteristic such as found in certain metals or semiconductor materials. The uniform conductivity is to be provided within practical limitations of the purity and homogenity of the materials used, the dimensional control of the thickness and electrical connections for conducting current to an external curcuit, for example. It is important that the current conducting characteristics of the drive layer 16 are directly or indirectly variable in a selective area immediately adjacent to the position of a magnetic domain, indicated generally by the reference numeral 17, in the magnetic layer 15. In the embodiment shown in FIGS. 1 and 2 the drive layer 16 is made of a semiconductor or ferromagnetic material, such as Permalloy, forming a magnetoresistive material. The conductivity of such magnetoresistive materials are varied in selected areas when the areas are subjected to a magnetic field different from another field applied to the remainder of the material or when no magnetic field is applied to the remainder of the material.

It is known that the magnetic domain material included in the magnetic layer 15 has a forward magnetization represented by the upward extending arrows 18 therein and when a bias magnetic field, represented by the arrows 19, is applied to the magnetic layer 15, a reverse magnetization region or regions represented by the arrows 20 extending downward, are formed. Such an isolated and discreet region or regions define at least one single wall domain and the magnetic domain 17. The magnetic domain 17 is usually cylindrical and is independent of the boundaries of the magnetic layer 15 and remains stable when the bias magnetic field 19 is not varied beyond a range of approximately plus or minus 20 percent and is movable indefinitely within the magnetic layer 15.

A unidirectional electric field is established in the drive layer 16 by a suitable means such as providing a pair of ohmic contact electrodes 21 and 21' at opposite ends of the drive layer and connecting the pair of electrodes 21 and 21' parallel to the plane of the drawing in FIG. 1 to a voltage source 22. The direct current potential E of the voltage source 22 establishes the level of the unidirectional electric field in the drive layer 16 which produces a uniform drive layer current J*o* having a substantially uniform current density throughout the drive layer material when no other current altering forces act upon the layer 16. The uniform drive layer current J*o* covers the upper face of the magnetic layer 16 and, as viewed in FIG. 1, is directed into the plane of the drawing and upward as viewed in FIG. 2. Due to the magnetoresistive characteristic of the material of the drive layer 16, the conductivity of the drive layer 16 is lower in an area directly above the presence of a magnetic domain 17 especially over the domain wall because it is subjected to the reverse magnetization 20 while the remainder of the drive layer 16 is subjected to the forward magnetization 18. This causes an alteration in the uniform drive layer current Jo such that a higher current density is developed in the area of the drive layer 16 immediately above the magnetic domain 17, as shown in FIG. 2. This change or alteration in the density of the uniform drive layer current as illustrated in FIG. 2 is a schematic showing for purposes of understanding this description while the exact characteristic of current change will change with different drive layer materials, for example, the current density may be lowered. This produces a region of perturbed current J1. As shown in FIG. 1, the cross hatched area of perturbed current J1 is immediately above the magnetic domain 17 and which is equivalent to an effective current shown by the pair of closed current loops designated J1 in FIG. 3. It is to be noted that the perturbed current J1 shown in FIG. 3 is in the same direction as the uniform drive layer current J*o* immediately above the magnetic domain 17 while being in an opposite direction outside the area immediately above the magnetic domain 17. Since the magnetic layer 15 and drive layer 16 are uniform throughout, the perturbed current J1 is formed in any region of the drive layer 16 immediately above the position of the magnetic domain 17 in the magnetic layer 15 so as to provide an external "dress" of current perturbations for each magnetic domain 17.

A resultant drive magnetic field represented by the dashed arrows 23 in FIG. 1 is associated around the perturbed current loops J1 shown in FIG. 3. This resultant drive magnetic field defines a magnetic gradient dress of the magnetic domain 17 in which the drive magnetic field 23 is directed in opposite directions on opposite sides of the magnetic domain 17, as shown in FIG. 1. It is seen, that the drive magnetic field 23 is in the same direction as the forward magnetization 18 of the magnetic layer 15 on the left-hand side of the magnetic domain 17 and is in an opposing direction to the magnetization 18 on the right-hand side thereof. This has the effect of a force shifting the domain wall to the right on the left-hand side as viewed in FIG. 1, as to decrease the domain area, and shifting the domain wall to the right as to expand the magnetic domain 17 on the right-hand side or, in other words, of moving the walls as viewed in FIG. 1 to the right in the direction of the phantom arrows designated V*d*. Accordingly, the direction of the velocity V*d* of domain propagation due to the propagating forces is to the right as viewed in FIGS. 1, 2 and 3. This propagating effect can also be seen in another manner in FIG. 3 around the perturbed current loops J1 since the drive magnetic field 23 produced by the perturbed current J1 increases the forward magnetization of the magnetic layer 15 on the left-side of the magnetic domain 17. There is a higher magnetization density indicated by the large number of dots 18' representing arrows 18 coming out of the plane of the drawing in FIG. 3 and a lesser number of dots 18'' shown at the right-hand of the magnetic domain 17. This indicates that the magnetic gradient produced by the drive magnetic field 23 is effective to interact with the magnetization of the magnetic domain 17 tending to move the domain wall and produce a domain propagation velocity V*d* perpendicular to the direction of the uniform drive layer current J*o*. It can be appreciated that if the pair of oppositely disposed end electrodes 21 and 21' are rotated through an angle of, for example, 90°, so as to be positioned at the left-hand and right-hand ends as viewed in FIGS. 1 and 2, the force developing the velocity of propagation/V*d* of the magnetic domain 17 will similarly be rotated so as to travel in a new direction which is displaced by ninety degrees.

A damping plate layer 24 is provided over the bottom face of the magnetic layer 15. The force propagating the magnetic domain 17 will normally be such a level as to continue to accelerate and the velocity of propagation noted above is taken for the case where the terminal domain velocity has been reached. The damping plate layer 24 is made of a conductive material such as copper wherein eddy currents are established by the moving magnetic domain to produce a retarding force or so-called viscous drag so that the terminal velocity is reached. This terminal velocity is proportional to the force to hold the magnetic domain stationary at a given level of the electric field in the drive layer 16. This viscous drag may be provided inherently with the use of certain magnetic layer and drive layer materials and is provided in Hall-effect type drive layer materials, for example, described hereinbelow. The damping effect of the layer 24 may be controlled by the conductivity characteristics or thickness of the damping plate material.

Figure 4:
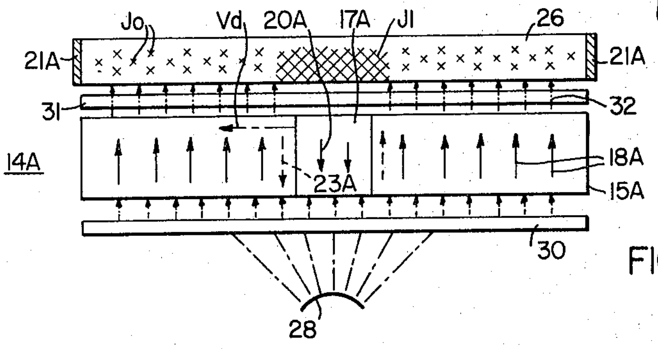
FIG. 4 is a cross-sectional view of one alternative embodiment of the magnetic domain propagation device shown in FIGS. 1 and 2.

In FIG. 4 is illustrated an alternative embodiment of the device 14 illustrated in FIGS. 1, 2 and 3 and is designated 14A. A magnetic layer 15A is provided as described hereinabove for the corresponding magnetic layer 15 in the device 14. A drive layer 26 is provided in the embodiment of FIG. 4 which is made of a photoconductance material in which the current conducting characteristics are varied in response to the intensity of polarized light radiating thereon. A pair of oppositely disposed end electrodes 21A and 21A' are oriented as are electrodes 21 and 21' in FIGS. 1 and 2 on the drive layer 26 for connection to a voltage source, not shown, corresponding to the voltage source 22 shown in the FIG. 2. The electric field established by the voltage source between the pair of electrodes 21A and 21A' establishes a uniform drive layer current J*o* in the same manner as described hereinabove for the drive layer 16.

It is known that the aforementioned rare earth orthoferrite materials which are used in the magnetic layer 14A have polarized light characteristics in which polarized light is transmitted or substantially blocked, in a ratio of approximately 1:18. The polarized light is rotated in either of opposite directions depending upon whether the light is traveling in the same direction or in the opposite direction relative to the magnetization within the magnetic layer material. Accordingly, a light source 28 is provided for radiating the lower face of the magnetic layer 15A opposite the face covered by the drive layer 26. A polarizing filter 30 is disposed between the light source 28 and the bottom face of the magnetic layer 15A and a second polarizing layer 31 is provided between the upper face of the magnetic layer 14A and the drive layer 26. By appropriate arrangement of the polarizing filters 30 and 31, light is transmitted through the filter 31 in regions where the polarized light is in the direction of the magnetization 18 of the magnetic layer 15A and is not transmitted through regions having a magnetic domain 17A since its reverse magnetization 20A is opposite to that of the remainder of the magnetic layer 15A. The polarized light, indicated by the phantom arrows 32, radiating the drive layer 26 creates a relatively higher conductivity while the region blocked from the light above the magnetic domain 17A will have a relatively lower conductivity. This causes a region of perturbed current J1 immediately above the magnetic domain 17A.

The resultant drive magnetic field produced by the perturbed current J1 is indicated by the dashed line arrows 23A. It is noted that the dashed arrows 23A are in an opposite sense of the direction from that of the drive field 23 shown in FIG. 1 since the perturbed current will have an oppositely directed force effect due to the reduced conductivity of the region above the magnetic domain 17A rather than an increased conductivity as provided in the drive layer 16. Accordingly, the velocity of domain propagation V*d* in the device 14A will be in an opposite direction, as indicated, than that shown in the device 14 in FIG. 1. This direction of velocity V*d* is also perpendicular to the direction of the uniform drive layer current Jo in the drive layer 26. Thus, it is seen that a perturbed current dress of the magnetic domain 17A is produced indirectly by the positioning of the magnetic domain 17A within the magnetic layer 15A with the location thereof being provided by the polarized light arrangement described for the propagation device 14A.

Figure 5:
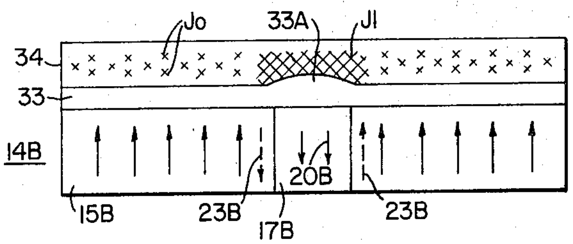
FIG. 5 is a cross-sectional view of an alternative embodiment of the magnetic domain propagation device shown in FIG. 4.

It is contemplated that other indirect arrangements responsive to the location of magnetic domain within a magnetic layer may be provided. For example, in FIG. 5 is shown a magnetic domain propagation device 14B including an intermediate layer 33 made of a magnetostriction material secured to a drive layer 34 made of a piezoresistance material over the magnetic layer 15B provided with a pair of opposite end electrodes 21B and 21B' as described above for connection to a voltage source. The reverse magnetization 20B of a magnetic domain 17B in the magnetic layer 15B causes a dimensional change shown as an exaggerated protrusion 33A in the intermediate layer 33 and therefore deforms the piezoresistance drive layer 34 in a region immediately above the magnetic domain. This change in the dimension of the drive layer 34 results in a change in the conductivity and thereby creates a region of perturbed current J1 in the uniform drive layer current J*o* as described above. The resultant drive magnetic field 23B produces domain movement in the direction of the arrow V*d* in accordance with the direction of the electric field applied to the drive layer 34 to establish the uniform drive layer current J*o* as also described hereinabove.

Figure 6:
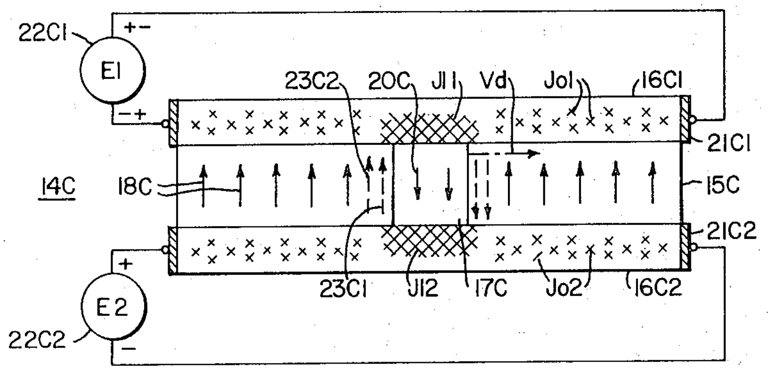
FIG. 6 is a cross-sectional view of a further alternative embodiment of the magnetic domain propagation device shown in FIGS. 1 and 2.

FIG. 6 illustrates another alternative embodiment of a magnetic domain propagation device and is designated generally by the numeral 14C. The magnetic propagation device 14C is provided with two drive layers 16C1 and 16C2 rather than the one layer 16. The first drive layer 16C1 corresponding to the drive layer 16 of FIG. 1 and a second substantially identical drive layer 16C2 are provided on opposite faces of a magnetic layer 15C corresponding to magnetic layer 15. Pairs of electordes 21C1 and 21C1' and 21C2 and 21C2' are provided on opposite ends of each of the drive layers 16C1 and 16C2 in the same manner as provided for the drive layer 16 in FIG. 2. It is understood that separate direct current voltage sources 22C1 and 22C2 corresponding to the voltage source 22 will be provided for connection to each of the pairs of electrodes 21C1 and 21C1' and 21C2 and 21C2', respectively for producing drive layer electric fields proportional to the respective potentials E1 and E2. Accordingly, a uniform drive layer current J*o*1 is directed through the drive layer 16C1 into the plane of the drawings as viewed in FIG. 6 and, correspondingly, a second drive layer current J*o*2 will be directed into the plane of the drawing in the drive layer 16C2. An external bias magnetic field, not shown, is provided as described for the device 14 so as to stabilize a magnetic domain 17C. The forward magnetization 18C of the magnetic layer 15C and the reverse magnetization 20C of the magnetic domain 17C indicated by the arrows 18C corresponding to the magnetic layer 15 forward magnetization described for the device 14.

The magnetic domain 17C produces regions of perturbed current J11 in the drive layer 16C1 and a perturbed current J12 in the drive layer 16C2 in accordance with the operation of the propagation device 14 as previously described. The resultant drive magnetic fields produced by the perturbed currents J11 and J12 are indicated by the dashed line arrows 23C1 and 23C2 having common directions. These resultant drive magnetic fields produce a domain propagation velocity V*d* in the manner as described for the drive magnetic field 23 in FIGS. 1 and 2. The propagation velocity V*d* is produced by a force proportional to the sum of the drive magnetic fields 23C1 and 23C2. If one of the voltage sources, for example 22C1, is capable of producing a unidirectional potential of opposite polarities the velocity of the magnetic domain will be proportional to the difference between the drive layer electric fields.

Figure 7:
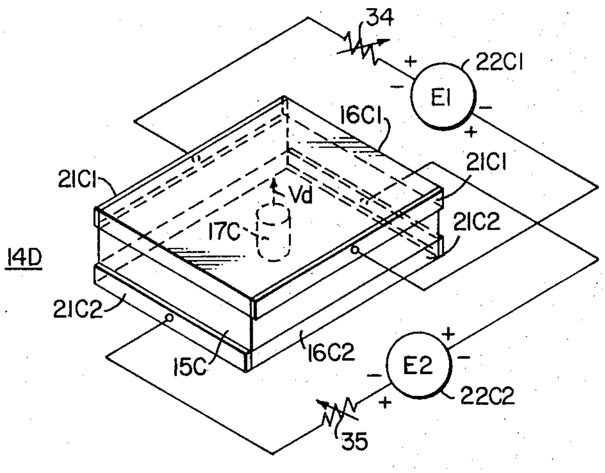
FIG. 7 is a schematic view of an alternative embodiment of the magnetic domain propagation device shown in FIG. 6.

The device 14D shown in FIG. 7 provides an alternative embodiment of the two input device 14C shown in FIG. 6. The device 14D is identical to the device 14C except that the pairs of electrodes 21C1 and 21C1′ and 21C2 and 21C2′ are oriented perpendicular to each other so that the uniform drive layer currents J11 and J12 will be at 90° to each other. If the potentials E1 and E2 are each capable of developing opposite polarities and can vary the potentials applied across the pairs of electrodes 21C1 and 21C1′ and 21C2 and 21C2′ by means such as variable resistors 34 and 35, a magnetic domain 17C in the magnetic layer 15C may be moved in any desired direction. The resultant drive magnetic fields 23C1 and 23C2 produced by the perturbed currents J11 and J12 in the device 14D will be perpendicular with the resultant force produced by these currents being at variable angles with respect to the directions of the fields and, therefore, produce a direction of domain velocity Vd at any desired direction in the magnetic layer 15C.

Figure 8:
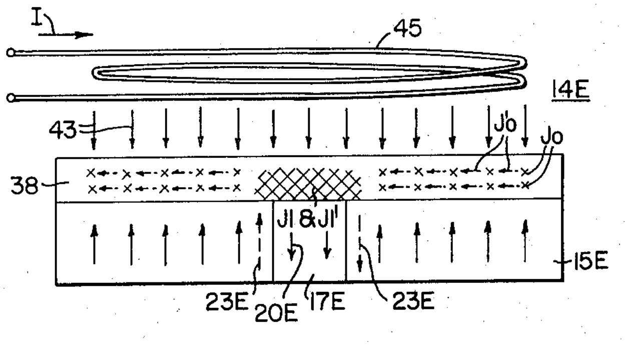
FIG. 8 is a cross-sectional view taken along axis VIII—VIII of FIG. 9.
Figure 9:
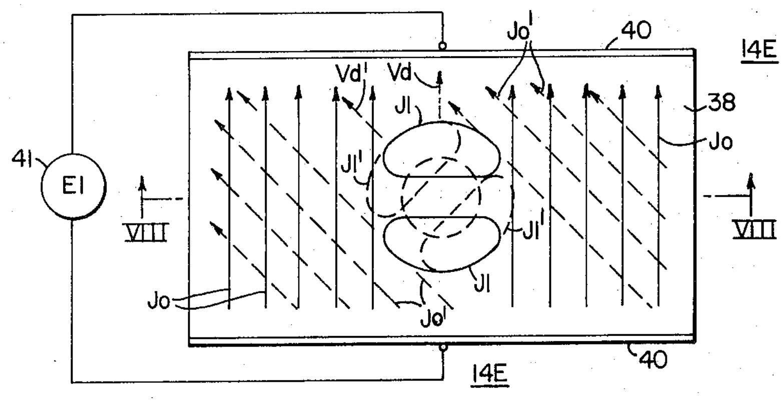
FIG. 9 is a top schematic view of another alternative embodiment of the magnetic domain propagation device shown in FIGS. 1 and 2.

Referring now to FIGS. 8 and 9, there is shown a further alternative embodiment of our invention including a magnetic domain propagation device generally designated 14E. A magnetic layer 15E is provided in the same manner as described for the magnetic layer 15 in the device 14. In accordance with the characteristics of the magnetic layer 15E, a magnetic domain 17E is provided therein upon application of an external bias magnetic field, not shown, such as 19 described in the aforementiond device 14. A drive layer 38 overlays the magnetic layer 15C in the same manner as described for the drive layer 16 in the device 14, so as to be in a magnetically coupled relationship. The material comprising the drive layer 38 is a semiconductor type having moderate to high carrier mobility in which carrier current flow is predominantly formed by one kind of carrier type, for example, N-type indium arsenide (InAs) or indium antimonide. A pair of electrodes 40 and 40′ are attached to the drive layer 38 as shown in FIG. 7 across a voltage source 41 producing a potential E1 and coresponding to the voltage source 22 described for the device 14. A control magnetic field, indicated by the arrows 43 is provided by a suitable magnetic field source indicated by a coil 45 having a current I applied thereto to produce the control magnetic field 43. This provides an alternate mode of operation for the device 14E as described further hereinbelow.

In a first mode operation of the device 14E the control magnetic field 43 is not used. The electric field established in the drive layer 38 produces a uniform drive layer current Jo as described hereinabove. The uniform drive layer current Jo is indicated by the arrows extending in a perpendicular relationship to the ends having the pair of electrodes 40 shown in FIG. 9. In this first mode of operation, the magnetic domain 17E causes perturbed current J1 in the drive layer 38 which is effectively defined by the pair of perturbed current loops J1 having a direction 16 which is perpendicular to the direction of the uniform drive layer current Jo. It is to be noted that the perturbed current loops J1 in FIG. 9 are oriented ninety degrees from the direction shown for the perturbed current loops J1 in FIG. 3 relative to the corresponding uniform drive layer currents Jo. This is because the direct effect of the reverse magnetization 20E of the magnetic domain 17E on the uniform drive layer current Jo in the device 14E is due to the effect of Lorentz forces to produce an alteration in the uniform drive layer current Jo. This effect corresponds to the Hall-effect characteristics of certain semiconductor materials whereby a region of perturbed current J1 is produced having the direction as mentioned above. The resultant drive magnetic field represented by the dashed arrows 23E in FIG. 8 produces a velocity of domain propagation Vd which is along the same axis with the sign determined by the sign of the carrier as the uniform drive layer current Jo. This is in contrast to the domain velocity of propagation in the device 14 which is perpendicular to the direction of the uniform drive layer current Jo in the magnetic layer 15. This difference is due, as noted, to the difference current perturbating characteristics between the material of the drive layer 38 which is a Hall-effect type and the material of the drive layer 16 in the device 14 which is a magnetoresistive type.

In a second mode of operation of the magnetic domain propagation device 14E the control magnetic field 43 is applied to the drive layer 38. It is to be understood that the control magnetic field 43 will be applied uniformly to the Hall-effect material of the drive layer 38. The effect of the control magnetic field 43 on the uniform drive layer current Jo is to reorient it in the direction indicated by the arrows Jo′. This orientation is shown somewhat exaggerated and is due to the Lorentz forces interacting between the control magnetic field 43 and the carriers establishing the uniform drive layer current Jo. Accordingly, the perturbed current loops J1′ are reoriented by the reorientation of the uniform drive layer current Jo′ as shown in FIG. 9.

In accordance with the operation of the device 14E the direction of the velocity of domain propagation Vd′ of the magnetic domain 17E will be in the direction of the reoriented uniform drive layer current Jo′. Since the corresponding resultant drive magnetic field 23E is oriented to the same extent that the uniform drive layer current Jo′ is reoriented. The extent of the reorientation or the effective rotation of the uniform drive layer current J1′ is in accordance with the intensity of the control magnetic field 43 and is shown greatly exaggerated as noted above. If the direction of the external control magnetic field 43 is reversed, then the reoriented uniform drive layer current Jo′ will be located in clockwise direction rather than in a counterclockwise direction from the uniform drive layer current Jo. Accordingly, the direction of the velocity of propagation of the magnetic domain 17E can be controlled in a device 14E by controlling the intensity of the control magnetic field 43 and by controlling the intensity of the electric field establishing the uniform drive layer current. As noted in further detail hereinbelow, the velocity of domain propagation Vd′ of the magnetic domain 17E is in response to the product of the electric field producing the uniform drive layer current Jo′ and the control magnetic field 43.

It is to be noted that the effect of the bias magnetic field, not shown, which is applied to the magnetic layer 15E to stabilize the magnetic domain 17E will also have a slight reorienting effect on the direction of the uniform drive layer count Jo. Since this reorienting effect is substantially constant, this effect is not illustrated in the device shown in FIGS. 8 and 9. Also, the Hall-effect drive layer 38 has some inherent viscous damping effect, as noted hereinabove, although a damping plate layer may be used if increase of damping is desired.

It is believed that the magnetic domain 17E in the device 14E is moved at a velocity $\overline{V}d'$ equal to $\mu(\overline{E} + (\mu/c)\ \overline{E} \times \overline{H})$ where $\mu$ is the mobility characteristic of the material of the drive layer 38, $\overline{E}$ is the vectorial component of the electric field in the drive layer 38 and $\overline{H}$ is the sum of a bias magnetic field and the control magnetic field 43, and $c$ is the velocity of light. Accordingly, the velocity $\overline{V}d'$ of the magnetic domain is controllable in response to the product of the magnitude and direction of the control magnetic field 43 and the magnitude and direction of the drive layer electric field and, correspondingly, the magnitude and direction of the uniform drive layer current $Jo'$. The potential E1 of the voltage source 41 and the current I in the coil 45 then determine the direction of velocity $Vd'$ of the magnetic domain 17E. It is seen that the device 14E illustrated in FIGS. 8 and 9 is a multiplying device since the velocity $Vd'$ of the magnetic domain 17E is in response to the product of the potential E1 and the current I.

If the current I and the potential E1 are alternating current signals, it has been determined that the resultant magnetic domain velocity $Vd'$ includes two orthogonal velocity components $Vd1$ and $Vd2$ where $Vd1$ is along the axis of the drive layer electric field i.e., the uniform drive layer current $Jo'$ and $Vd2$ is perpendicular to the axis of the uniform drive layer current $Jo'$. The velocity $Vd1$ has only an oscillatory effect so as to move the magnetic domain 17E in an oscillatory movement about a fixed point controlled directly by the frequency of the electric field in the drive layer 38. However, the velocity $Vd2$ being perpendicular to the axis of the uniform drive layer current $Jo'$ is a function of the vertical product of the drive layer electric field and the control magnetic field 43 and, therefore, the product of the potential E1 and the current I times the cosine of the phase angle between the E1 and I input signals. The linear distance, neglecting purely oscillatory components which are believed included in each of the velocity components $Vd1$ and $Vd2$ and which cancel each other over an extended time interval, travelled by the magnetic domain 17 is believed to be equal to the equation $$L = \frac{\mu^2}{c} \int_0^t \frac{EH}{2} \cos \phi dt$$

or L is equal to a constant value $$K \text{ times } \int_0^t IE1 \cos \phi dt.$$

Figure 12:
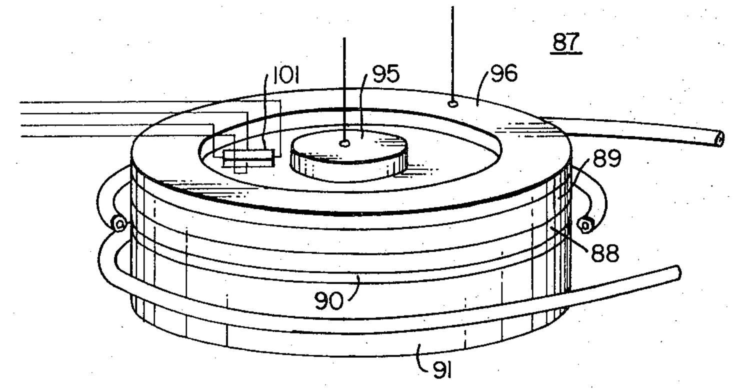
FIG. 12 is a schematic illustration of a watthour metering apparatus including a magnetic domain propagation device made in accordance with this invention.
Figure 13:
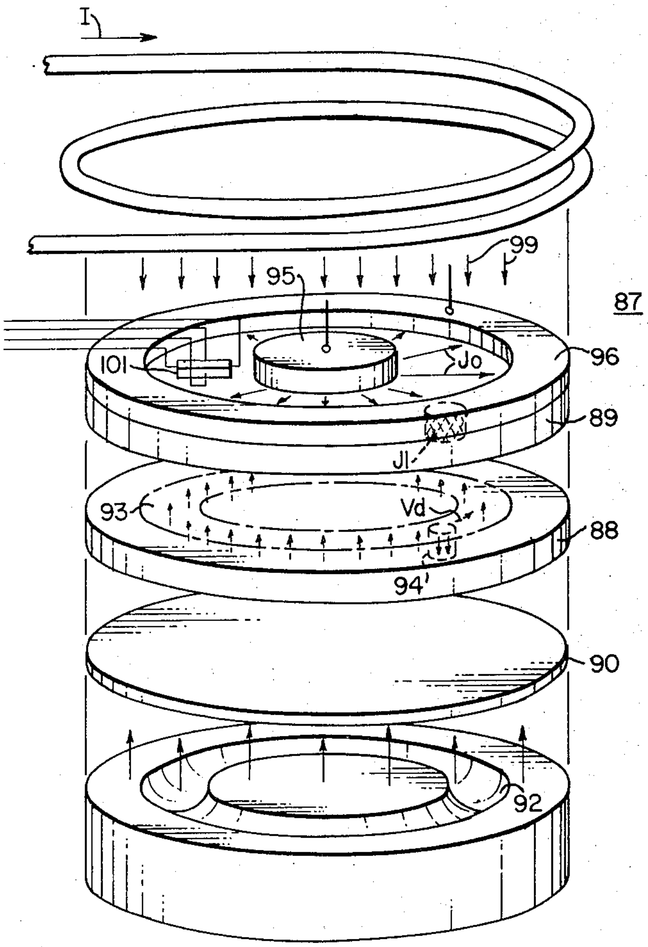
FIG. 13 is an exploded view of FIG. 12.
Figure 14:
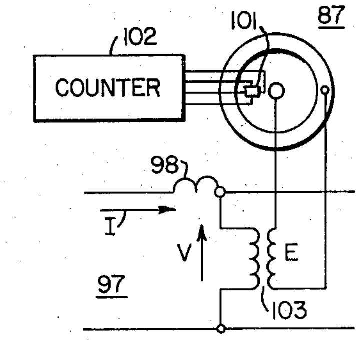
FIG. 14 is a schematic circuit diagram of an electrical circuit including in the watthour metering apparatus illustrated in FIG. 12.

This effect has been determined to be useful in the construction of a watthour metering device since L is the measure of the watthours of the E1 and I components of an alternating current electric power to be measured. A device constructed in accordance with this principal is illustrated in FIGS. 12, 13 and 14 described hereinbelow.

Figure 10:
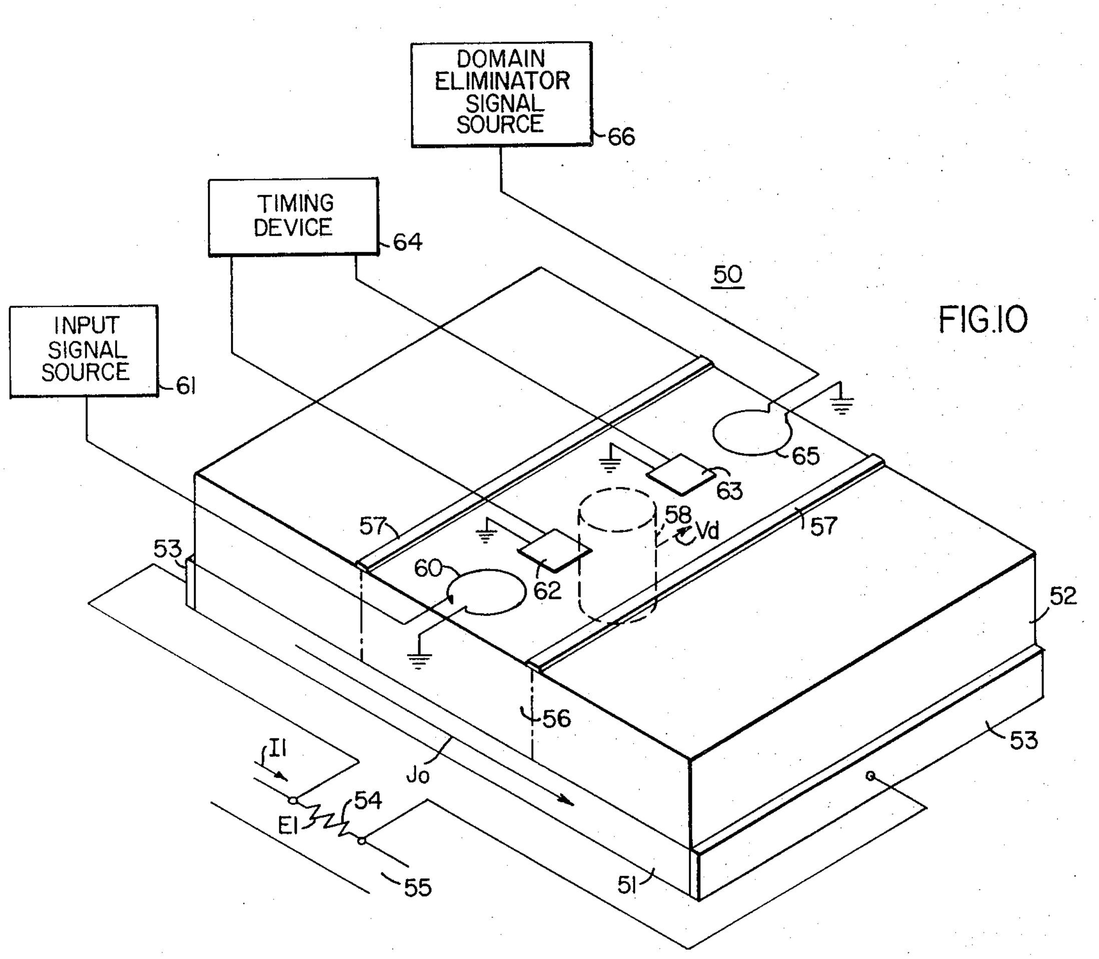
FIG. 10 is a schematic illustration of an average current measuring apparatus including a magnetic domain propagation device made in accordance with this invention.

As can be appreciated by those skilled in the art, a magnetic domain propagation device made in accordance with our invention is easily adapted into various operative arrangements where limitations of fixed magnetic domain paths of some prior art devices are desired to be avoided as is the necessity of an externally applied drive magnetic field. In FIG. 10 there is shown a current measuring apparatus 50 including a magnetic domain propagation device made in accordance with our invention. The apparatus 50 includes a drive layer 51 constructed in accordance with the drive layer 16 of the device 14. A magnetic layer 52 is formed as also described for the magnetic layer 15 in the device 14. A pair of drive layer electrodes 53 and 53' are connected across the voltage dropping resistor 54. The resistor 54 is connected in a circuit 55 having a current I1 to be measured by the apparatus 50. The current I1 passing through the resistor 54 develops a potential E1 which establishes an electric field in the drive layer 51 which in turn provides a uniform drive layer current $Jo$ between the electrodes 53 as also described hereinabove. The magnetic layer 52 is preferably formed with a domain channel 56 extending perpendicular to the direction of the uniform drive layer current $Jo$. The channel 56 is formed by a pair of magnetic strips 57 which may be of a material such as Permalloy which is understood by those skilled in the art to maintain a magnetic domain indicated by the numeral 58 within a channel 56 having the sides thereof defined by the spacing of the strips 57. A loop conductor 60 is positioned at a magnetic domain input location at one end of the channel 56 and is connected to an input signal source 61 so as to develop the magnetic domain 58 beneath the loop conductor 60 in accordance with known techniques. A pair of magnetic domain detectors 62 and 63 are substantially aligned with the loop conductor 60 above the channel 56 and are spaced a predetermined distance apart. The detectors may be of a suitable type understood by those skilled in the art including Hall-effect or magnetroresistive materials which generate signals and response to the magnetic domain 58 passing beneath them. The detectors 62 and 63 are connected to a timing device 64 for determining the time interval between signals generated in the detectors 62 and 63 as the magnetic domain 58 passes from the input loop conductor 60 along the channel 56. At the opposite end of the channel 56 is a loop conductor 65 connected to a domain eliminator signal source 66 which applies an appropriate signal to the loop conductor 64 to cause a magnetic domain 58 to be destroyed or eliminated upon reaching the area of the channel 56 directly beneath the loop conductor 65.

In operation of the current measuring apparatus 50, the input signal source 61 generates a magnetic domain 58 beneath the loop conductor 60. The potential E1 across the resistor 54 establishes a uniform drive layer current $Jo$ responsive to the level of the current I. The reverse magnetization of the magnetic domain 58 establishes a perturbed current region as described hereinabove and the resultant drive magnetic field establishes a velocity of domain propagation $Vd$ for the magnetic domain 58 in the channel 56 toward the opposite end thereof. Since the velocity of the magnetic domain 58 is proportional to the intensity of the uniform drive layer current $Jo$, the time for travel between the detectors 62 and 63 will vary in accordance with the average value of the current I1. Accordingly, an output of the timing device 64 correlates the time for travel of the magnetic domain 58 between the detectors 62 and 63 to a current value for registering the average value of the current I1.

The current measuring apparatus 50 shown in FIG. 10 is adaptable to several obvious modifications, for example, if a second drive layer is provided in accordance with the magnetic domain propagation device illustrated in FIG. 6 then two current inputs could be applied to the apparatus shown in FIG. 10. The timing device 64 would then provide an indication of the average value for the sum of the two input currents establishing the levels of uniform drive layer currents in each of the two drive layers when they are in a common direction.

Figure 11:
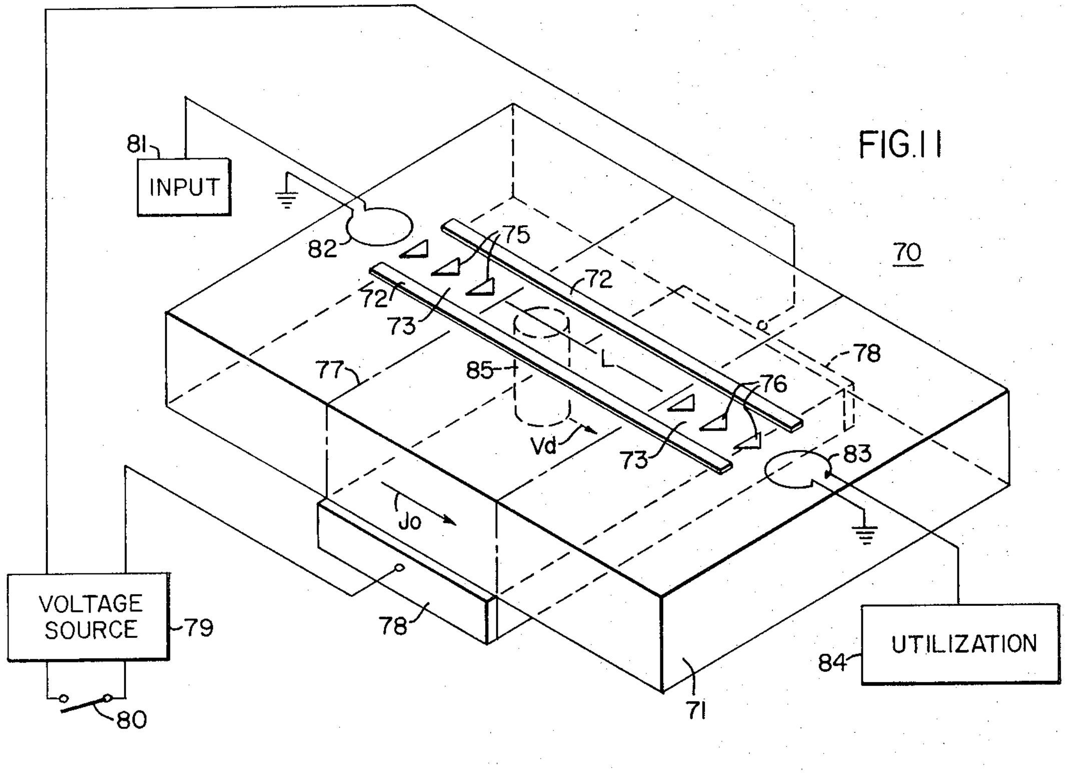
FIG. 11 is a schematic illustration of a gating apparatus including a magnetic domain propagation device made in accordance with this invention.

Referring now to FIG. 11, there is illustrated a gating apparatus 70 utilizing a magnetic domain propagation device made in accordance with this invention for applications adapted for use in digital logic, memory storage or computer inputs. A magnetic layer 71 corresponds to the magnetic layer 52 in FIG. 10. A pair of Permalloy strips 72 define a hybrid magnetic domain channel 73 in a manner also described. A conventional magnetic domain propagating arrangement is included between the strips 72 is regions 71A and 71C of the layer 71, outside the parallel planes 74 and 74', and is formed by two spaced sets of "angelfish" elements 75 and 76. A gap between the sets of elements 75 and 76 is spaced apart a length L on the top of the magnetic layer region 71B. A drive layer 77 extends perpendicular to the channel 73 on the bottom of the magnetic layer 71 and the side edges thereof establish the planes 74 and 74' to define the region 71B. The drive layer 77 is constructed in accordance with the drive layer construction described hereinabove for the apparatus 50 in FIG. 10. The drive layer 77 is provided with a pair of electrodes 78 and 78' for establishing an electric field therein. A voltage source 79 including a switch means 80 is connected across the pair of electrodes 78. The switch 80 is shown schematically as a simple switch having open and close positions, however, it is contemplated that an electronic switching means would replace the switch 80. Accordingly, upon opening and closing the switch 80 an electric field for establishing a uniform drive layer current $J_o$ in the drive layer 77 may be selectively applied and removed. An input signal source 81 connected to a loop conductor 82 is positioned at an input location of the channel 73. The opposite end of the channel 73 is provided with a loop conductor 83 connected to a utilization device 84. The loop conductor 83 forms a domain output detector at the end of the angelfish set 76.

Associated with the two sets of angelfish elements 75 and 76 is an externally applied rotating magnetic field to move a magnetic domain 85 generated at the loop conductor 82 along the channel 73 in the layer region 71A until reaching the beginning of the length L in the magnetic layer 71. If the switch 80 is open, the magnetic domain 85 will not pass along the length L in the layer region 71B of the channel 73. However, if the switch 80 is closed the magnetic domain 85 will generate a region of current perturbation in the drive layer 77 and be propagated along the length L in the region 71B to the beginning of the layer region 71C below the second angelfish set 76 whereupon it will be propagated by the externally applied rotating magnetic field to the output detector 83. Accordingly, the open and closed condition of the switch 80 could correspond to a logic zero or one state and the input signal source could correspond to an interrogation signal with the readout depending upon the state of the switch 80. A signal or absence of a signal at the loop conductor 83 would provide the appropriate state of a corresponding readout signal. Therefore, the gating apparatus 70 is capable of providing a readout at the utilization device 84 corresponding to the logic state of the switch 80 in response to an interrogating type of signal provided by the input signal source 81.

It is to be understood that the gating apparatus 70 is adaptable to various uses in which it is desired to control the propagation of a magnetic domain within a channel such as the channel 73. Further, it is apparent that an alternative drive layer material made of the aforementioned Hall-type may be substituted for the drive layer 77 in which case the electrodes would be disposed perpendicular to that shown in FIG. 11.

Referring now to FIGS. 12, 13 and 14 there is shown a watthour metering apparatus generally designated by the numeral 87 including a magnetic domain propagation device operating in a manner similar to that described for the device 14E illustrated in FIGS. 8 and 9 and described hereinabove. A magnetic layer 88 made in accordance with the magnetic domain propagation devices described hereinabove is provided with a generally circular disk configuration. A drive layer 89 having a similar circular configuration is disposed adjacent the top face of the magnetic layer 88. The material of the drive layer 89 corresponds to the semiconductor type material disclosed in the drive layer 38 of the propagation device 14E having a high carrier mobility and exhibiting the Hall-effect characteristics. The aforementioned InAs semiconductor material is one preferred material for use in the drive layer 89. An electrically conducting damping plate layer 90 having a similar circular disk configuration to that of the magnetic layer 88 is stacked adjacent the bottom face thereof. This provides the viscous damping to retard the movement of a magnetic domain travelling in the magnetic layer 88 as described for the damping plate layer 24 in FIG. 1. The bias magnetic field for stabilizing a magnetic domain region in the magnetic layer 88 is provided by a permanent magnet 91 having an outer circular periphery of a substantially common diameter as that of the magnetic layer 88. As shown in FIG. 13 a circular groove 92 is provided on the upper face of the permanent magnet 91 in facing relationship with the bottom face of the magnetic layer 88. The annular groove develops a circular magnetic domain channel 93 in the magnetic layer 88 since the groove 92 establishes a slightly lower magnetization field in the magnetic layer 88 immediately above the groove 92 and thus forms domain channel 93 defining a preferred circular and continuous path for magnetic domain movement. The channel 93 formed in this manner aids in compensating for a possible tendency of the domain 94 to move radially in response to any radial gradient in the substantially uniform current $J_o$ formed by the concentric electrode assembly described hereinafter. A magnetic domain 94 is provided in the channel 93 and is rotated in response to two watthour input signals connected to the watthour metering apparatus 87 as described hereinafter.

A center electrode 95 is provided in the center of the drive layer 89 and a ring electrode 96 is disposed adjacent the outer periphery of the drive layer 89. The ring electrode 96 is radially disposed at an equal distance from the outer diameter of the center electrode 95 so as to be concentric therewith. The electrodes 95 and 96 are disposed relative to the inner and outer diameters of the circular domain channel 93 so that a potential established across these electrodes establishes a radial electric field in the drive layer 89 extending across the top of the circular channel 93. The electrodes 95 and 96 are connected at a voltage source E developed by a voltage component V of a source of electrical power to be measured in an electrical circuit 97 illustrated in FIG. 14. A coil 98 develops a control magnetic field indicated by the arrows 99 in response to a current I applied to the coil 98. The current I is associated with the electrical circuit 97 in which I is the current component of the electric power flowing therein to be measured. A magnetically responsive domain detector 101 is provided by a Hall-effect device which is located on the drive layer 89 in the annular space between the electrodes 95 and 96 above the domain channel 93. The detector 101 senses the passing of the magnetic domain 94 thereunder. It is to be understood that any suitable type of magnetic domain detector may be used for the detector 101. The output of the detector 101 is connected to a counter circuit 102, shown in FIG. 14 which accumulates the total pulse signals produced by each revolution of the magnetic domain 94 in the channel 93.

As noted above, the electric circuit 97 includes voltage and current components V and I of an electric power flowing in the circuit 97 shown in FIG. 14 to be measured by the watthour metering apparatus 87. The coil 98 is connected in series with the circuit 97 so as to establish the control magnetic field 99 in accordance with the alternating current I input thereto. The voltage component V of the electric power in the circuit 97 is developed by a potential transformer 103 in which the secondary winding develops the potential E for establishing the electric field in the drive layer 89.

The operation of the watthour metering apparatus 87 is believed to be in accordance with the equation for the velocity of magnetic domain propagation noted hereinabove in connection with the description of the magnetic domain propagation device 14E illustrated in the FIGS. 8 and 9 as modified by the damping plate layer 90 which retards the velocity of propagation V*d* of the magnetic domain 94 in accordance with the ratio of the conductivity of InAs of the drive layer 89 to the conductivity of copper of the damping plate layer 90 where these layers have substantially the same thickness.

The permanent magnet 91 stabilizes the magnetic domain 94 in the domain channel 93. A substantially uniform drive layer current J*o* extends radially in the drive layer 89 between the center electrode 95 and the ring electrode 96 in the absence of the fields of the permanent magnet 91 and the control magnetic field 99. The effect of the concentric electrodes 95 and 96 in causing the current J*o* to pass through a radial expanding area outwardly may cause a slight radial gradient which is not substantially or is compensated for by the permanent magnet groove 92 arrangement. Since the potential E applied across the electrodes 95 and 96 is sinusoidal. The uniform drive layer current J*o* is variable as a function of time in a oscillating manner. In the absence of the control magnetic field 99 this would cause the magnetic domain to oscillate in a slightly eliptical path with the long axis thereof in a radial direction. This eliptical motion is provided due to the fact that the constant bias magnetic field of the permanent magnet 91 causes the uniform drive layer current J*o* to be reoriented slightly from the radial direction. This is due to the reorientation effects caused by the Lorentz forces produced between the permanent magnet field and carrier current forming the current J*o*. When the alternating current component I is applied to the coil 98 the control magnetic field 99 is added to the bias magnetic field of the permanent magnet 91 to further reorient the uniform drive layer current J*o* due the additional Lorentz forces, however, in a time varying manner.

The reverse magnetization of the magnetic domain 94 creates a region of perturbed current J1 in the uniform drive layer current J*o* in accordance with this invention as described hereinabove. A resultant drive magnetic field produces a domain propagating force which has an average effect to move the magnetic domain 94 in tangential or perpendicular direction to the radius of the circular channel 93. As noted hereinabove in the description of the propagation device 14E, the direction of the velocity of propagation V*d* of the magnetic domain is substantially perpendicular to the uniform drive layer current J*o* and the magnitude of the velocity V*d* is proportional to the product of the potential E and the total external magnetic fields applied to the drive layer 89. In turn this velocity is a function of the product of the current component I and voltage component V and the cosine of the phase angle between a current and voltage components I and V. It is noted hereinabove that the distance L travelled by the magnetic domain is expressed by the equation $$L = \frac{\mu^2}{c} \int_0^t \frac{EH}{2} \cos \phi dt$$

where the integral has been carried over a whole number of cycles or prolonged periods of time so that the oscillatory terms included but not set forth in the above equation averages out to zero. Accordingly, if the E and H terms are proportional to the voltage and current components V and I of the electric power in the circuit 97, then the distance that the magnetic domain 94 travels is proportional to the number of watthours to be measured at the circuit 97.

The distance travelled by the magnetic domain 94 is measured by the counter 102 connected to the detector 101 which registers a pulse each instant that the magnetic domain passes beneath. Accordingly, the total distance travelled by the magnetic domain 94 is measured by the total number of counts of the revolutions in the channel 93. A known constant of proportionality can be determined in a known manner so that the counter circuit 102 produces an indication of the measured watthours of electrical power flowing in the circuit 97 for a given time period.

Other modifications and forms of our invention may be made as it is apparent to those skilled in the art without departing from the spirit and scope of this invention.

We claim:

1. A magnetic domain propagation device comprising: a magnetic layer having one direction of magnetization and at least one magnetic domain having an opposite direction of magnetization movable in said magnetic layer; a drive layer overlaying said magnetic layer in a magnetic coupled relationship, said drive layer conducting a uniform current therethrough when an electric field is applied to said drive layer; a pair of electrodes connected to said drive layer for connection to a voltage source effective to apply an electric field such that said uniform current is developed with a substantially uniform density having a magnitude responsive to the magnitude of said electric field; and current altering means responsive to the magnetization of a magnetic domain in said magnetic layer so as to vary the uniform current density of said drive layer and define a region of perturbed current adjacent said magnetic domain, said perturbed current being effective to produce a resultant drive magnetic field for moving said magnetic domain in said magnetic layer at a velocity responsive to the magnitude and direction of said uniform current.

2. The magnetic domain propagation device as claimed in claim 1 wherein said drive layer includes a piezoresistance material and wherein said current altering means includes a layer of magnetostrictive material is bonded to said drive layer so as to be disposed between said drive layer and said magnetic layer, whereby the magnetization of said magnetic domain in said magnetic layer effects a deformation in said layer of magnetostrictive material so as to in turn deform said drive layer in a region adjacent said magnetic domain and to change the conductivity of said drive layer to produce said region of perturbed current for effecting said resultant drive magnetic field.

3. The magnetic domain propagation device as claimed in claim 1 wherein said drive layer includes a photoconductance material, and wherein said current altering means includes first and second polarizing filters with said first polarizing filter being disposed between one face of said magnetic layer and said drive layer and said second polarizing filter disposed on an opposite face of said magnetic layer, whereby said opposite magnetization of said magnetic domain alters polarized light passing between said magnetic layer and said drive layer so as to vary the conductivity of said drive layer in a region adjacent said magnetic domain to thereby produce said region of perturbed current and to effect said resultant drive magnetic field.

4. A magnetic domain propagation device comprising: a magnetic layer having a given direction of magnetization and at least one magnetic domain having a different direction of magnetization and being movable in said magnetic layer; a drive layer overlaying said magnetic layer in a magnetic coupled relationship, said drive layer having a uniform current conducting characteristic; means applying an electric field effective to develop a uniform current of uniform density in said drive layer, said uniform current having a magnitude and direction directly responsive to the magnitude and direction of said electric field, said different direction of magnetization of said magnetic domain in said magnetic layer being effective to alter the uniform current density of said drive layer in a region of perturbed current immediately adjacent said magnetic domain, and said region of perturbed current being effective to produce a resultant drive magnetic field acting through said magnetic coupled relationship so as to move said magnetic domain in said magnetic layer at a velocity responsive to the magnitude and direction of said uniform current.

5. The magnetic domain propagation device as claimed in claim 4 wherein said drive layer includes a magnetoresistive material, and wherein said different direction of magnetization of said magnetic domain alters the conductivity of said drive layer in a region immediately adjacent said magnetic domain to produce the region of perturbed current therein.

6. The magnetic domain propagation device as claimed in claim 4 wherein a damping plate layer made of an electrically conductive material extends across said magnetic layer to retard the velocity of travel of said magnetic domain.

7. The magnetic domain propagation device as claimed in claim 4 wherein said drive layer includes a semiconductor material having a high electrical carrier mobility so as to have a Hall effect like characteristic whereby said different direction of magnetization of said magnetic domain alters the uniform current density of said drive layer due to the effect of the magnetization of said magnetic domain upon the carriers forming said uniform current density in said drive layer thereby altering said uniform current density in a region adjacent said magnetic domain to produce said region of perturbed current and thereby produce the resultant induced drive magnetic field.

8. The magnetic domain propagation device as claimed in claim 4 including an external control magnetic field source directed to said drive layer for reorienting the direction of the uniform current density therein so as to vary the orientation of said perturbed current and thereby vary the effect of said resultant magnetic drive field for varying the direction in which the magnetic domain moves.

9. A magnetic domain propagation device as claimed in claim 8 including a first input signal source controlling the external control magnetic field in response to a first input signal and further including a second input signal source controlling the intensity of said electric field and said drive layer in response to a second signal applied thereto whereby the velocity of propagation of a magnetic domain in said magnetic layer is responsive to the product of said first and second input signals.

10. A magnetic domain propagation device as claimed in claim 9 wherein said first and second input signals are sinusoidally varying alternating current signals whereby the velocity of propagation of said magnetic domain corresponds to the product of the instantaneous magnitudes of said first and second input signal times the cosine of the phase angle between said first and second input signals.

11. The magnetic domain propagation device as claimed in claim 4 including another drive layer overlaying the magnetic layer along a face opposite of that overlaid by the first named drive layer, said another drive layer having a uniform current conducting characteristic, means for applying another electric field effective to develop a uniform current of uniform density in said another drive field, said last named uniform current having a magnitude and direction directly responsive to the magnitude and direction of said another electric field, whereby the magnetization of said magnetic domain produces a region of perturbed current in the uniform current density in said another drive layer immediately adjacent said magnetic domain such that the magnetic domain is propagated in response to both of the first named and another electric field producing the uniform current densities in said first named drive layer and said another drive layer.

12. A magnetic domain propagation device as claimed in claim 11 wherein first and second pairs of electrodes are included, each pair being disposed on a separate one of the drive layers along mutually nonparallel axes, and wherein first and second voltage sources are included, said first and second voltage sources being connected to said first and second pairs of electrodes respectively, to apply the electric fields to the first named and said another drive layers such that variation of the potentials of said first and second voltage sources correspondingly change the direction of the magnetic domain movement in said magnetic layer.

13. A magnetic domain propagation device as claimed in claim 4 wherein said magnetic layer includes means for defining a channel through said magnetic layer and wherein said drive layer has a uniform current in a predetermined direction so that said magnetic domain within said channel is moved along said channel by the perturbed current developing the resultant magnetic drive field for producing the desired movement of said magnetic domain along said channel.

14. A magnetic domain propagating device as claimed in claim 13 wherein said drive layer includes a semiconductor material having a high electrical carrier mobility so as to have a Hall effect like characteristic whereby the magnetization of said magnetic domain alters the uniform current density in a region of immediately adjacent said magnetic domain, wherein said channel is formed in a closed circular path, and wherein an external control magnetic field source directs a magnetic field through said drive layer to effect further alteration of said uniform current such that the magnetic domain is moved by the resultant magnetic drive around said channel.

15. The magnetic domain propagation device as claimed in claim 13 including a conductor positioned on said magnetic layer at one end of said channel and connected to an input signal source for establishing a magnetic domain at the one end of said channel; and a magnetically responsive detector positioned along said channel and connected to a utilization device for applying an impulse to said utilizing device in response to movement of a magnetic domain past the detector whereby the magnetic domain begins movement at one end of said channel and is moved past said detector at a velocity corresponding to the intensity of said uniform current density of said drive layer.

16. The magnetic domain propagation device as claimed in claim 15 wherein a pair of detectors including said first named detector are disposed along said channel for intiating impulses responsive to the movement of said magnetic domain within said channel, wherein a timing device is connected to said pair of detectors for measuring the time interval for said magnetic domain to travel between said detectors so as to produce an indication of the velocity of said magnetic domain which is proportional to the intensity of said uniform current density of said drive layer.

17. A magnetic domain propagation device as claimed in claim 13 wherein said channel includes two sets of magnetic domain propagating elements wherein each set is spaced from the other set a desired length apart, wherein an external magnetic field source is provided for propagating a magnetic domain within said channel along said second sets of elements, and wherein said drive layer is positioned along the length of said channel between said sets of domain propagating elements whereupon a magnetic domain is moved between said first and second sets of magnetic domain propagating elements exclusively in response to the uniform current density of said drive layer.

18. The magnetic domain propagation device as claimed in claim 17 including a voltage source having a switch means for selectively applying the potential of said voltage source across said drive layer so as to apply said electric field to develop said uniform current density in said drive layer when said switch is closed and to terminate said uniform current density when said switch is open thereby selectively controlling the movement of a magnetic domain moving from said first set of domain propagating elements to said second set of domain propagating elements.

19. A watthour metering apparatus comprising: a magnetic layer of magnetic domain propagating material having at least one magnetic domain; a drive layer formed of a semiconductor material having a high carrier mobility wherein current in said drive layer is formed by a carrier of one type; means establishing a circular magnetic domain channel in said magnetic layer so as to define a predetermined circular path for said one magnetic domain; a first electrode attached to said drive layer so as to be equally spaced from an inner diameter of said channel, a second electrode positioned on said layer so as to be equidistantly spaced relative to the other diameter of said channel and therefore equidistantly from said first electrode; and a magnetic field source for providing an external control magnetic field to the area of said drive layer intermediate said first and second electrodes; a magnetically responsive domain detecting means mounted in magnetically coupled relationship with said channel of said magnetic layer so as to effect an electrical impulse in response to movement of a magnetic domain in said channel upon passing said detector; a voltage responsive input signal being responsive to the voltage component of an electrical power quantity to be measured and connected across said first and second electrodes so as to establish an electric field in said drive layer in response to the instantaneous magnitude of said voltage component such that a substantially uniform current density is established in said drive layer between said first and second electrodes and adjacent said channel; a current responsive input signal responsive to the current component of the power quantity to be measured by said apparatus and connected to said magnetic field source so as to control said external control magnetic field in response to the instantaneous magnitude of said current component and to orient said uniform current density in response thereto whereby said magnetic domain is propagated at a velocity proportional to the product of the voltage and current power components and the number of impulses generated by said detector is proportional to watthours of electric energy of the measured electrical power.

20. The watthour metering apparatus as claimed in claim 19 wherein said magnetic field source includes a current coil.

21. The watthour metering apparatus as claimed in claim 20 wherein said means for providing a circular domain channel includes a permanent magnet having an annular groove facing said magnetic layer.

* * * * *